US009014266B1

(12) United States Patent
Gu et al.

(10) Patent No.: US 9,014,266 B1
(45) Date of Patent: Apr. 21, 2015

(54) DECIMATED SLIDING WINDOWS FOR MULTI-REFERENCE PREDICTION IN VIDEO CODING

(75) Inventors: Qunshan Gu, Hayward, CA (US); Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 497 days.

(21) Appl. No.: 13/489,033

(22) Filed: Jun. 5, 2012

(51) Int. Cl.
  H04N 7/12       (2006.01)
  H04N 9/82       (2006.01)
  H04N 19/159     (2014.01)

(52) U.S. Cl.
  CPC .................................. H04N 19/159 (2013.01)

(58) Field of Classification Search
  USPC ................. 375/240.12–240.13; 386/245–248
  See application file for complete search history.

(56) References Cited

U.S. PATENT DOCUMENTS

| | | | |
|---|---|---|---|
| 4,816,906 A | 3/1989 | Kummerfeldt et al. |
| 4,924,310 A | 5/1990 | von Brandt |
| 5,148,269 A | 9/1992 | de Haan et al. |
| 5,337,086 A | 8/1994 | Fujinami |
| 5,371,841 A | 12/1994 | Jones |
| 5,389,068 A | 2/1995 | Keck |
| 5,398,068 A | 3/1995 | Liu et al. |
| 5,442,458 A | 8/1995 | Rabbani et al. |
| 5,461,423 A | 10/1995 | Tsukagoshi |
| 5,483,287 A | 1/1996 | Siracusa |
| 5,512,952 A | 4/1996 | Iwamura |
| 5,568,200 A | 10/1996 | Pearlstein et al. |
| 5,576,767 A | 11/1996 | Lee et al. |
| 5,586,285 A | 12/1996 | Hasbun et al. |
| 5,686,962 A | 11/1997 | Chung et al. |
| 5,717,394 A | 2/1998 | Schwartz et al. |
| 5,731,840 A | 3/1998 | Kikuchi et al. |
| 5,767,909 A | 6/1998 | Jung |
| 5,818,536 A | 10/1998 | Morris et al. |
| 5,886,742 A | 3/1999 | Hibi et al. |
| 5,912,676 A | 6/1999 | Malladi et al. |
| 5,926,226 A | 7/1999 | Proctor et al. |

(Continued)

FOREIGN PATENT DOCUMENTS

EP  0634873  1/1995
EP  1351510  10/2003

(Continued)

OTHER PUBLICATIONS

Bankoski et al. "Technical Overview of VP8, an Open Source Video Codec for the Web". Dated Jul. 11, 2011.

(Continued)

*Primary Examiner* — Dave Czekaj
*Assistant Examiner* — Tsion B Owens
(74) *Attorney, Agent, or Firm* — Young Basile Hanlon & MacFarlane P.C.

(57) ABSTRACT

Decimated sliding windows for multi-reference prediction are disclosed. Reference frames for coding using motion prediction are stored in two or more buffers, which can be arranged as first-in-first-out stacks. As new reference frames are added to a first buffer, the least recently used reference frame is either moved to a second buffer or discarded depending upon a decimation factor. More than two buffers can be used, and each of the buffers can have the same or a different decimation factor. This permits both short duration and long duration availability of reference frames while minimizing memory usage and overhead in the encoded video bitstream.

20 Claims, 8 Drawing Sheets

(56) References Cited

U.S. PATENT DOCUMENTS

| | | | |
|---|---|---|---|
| 5,991,447 A | 11/1999 | Eifrig et al. |
| 5,999,641 A | 12/1999 | Miller et al. |
| 6,005,980 A | 12/1999 | Eifrig et al. |
| 6,075,875 A | 6/2000 | Gu |
| 6,108,383 A | 8/2000 | Miller et al. |
| 6,181,822 B1 | 1/2001 | Miller et al. |
| 6,222,174 B1 | 4/2001 | Tullis et al. |
| 6,272,179 B1 | 8/2001 | Kadono |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,473,463 B2 | 10/2002 | Agarwal |
| 6,560,366 B1 | 5/2003 | Wilkins |
| 6,658,618 B1 | 12/2003 | Gu et al. |
| 6,661,842 B1 | 12/2003 | Abousleman |
| 6,711,211 B1 | 3/2004 | Lainema |
| 6,735,249 B1 | 5/2004 | Karczewicz et al. |
| 6,774,924 B2 | 8/2004 | Kato et al. |
| 6,774,929 B1 | 8/2004 | Kopp |
| 6,909,749 B2 | 6/2005 | Yang et al. |
| 6,985,527 B2 | 1/2006 | Gunter et al. |
| 7,027,654 B1 | 4/2006 | Ameres et al. |
| 7,085,319 B2 | 8/2006 | Prakash et al. |
| 7,221,710 B2 | 5/2007 | Lee |
| 7,253,831 B2 | 8/2007 | Gu |
| 7,406,053 B2 | 7/2008 | Cheung et al. |
| 7,499,492 B1 | 3/2009 | Ameres et al. |
| 7,532,808 B2 | 5/2009 | Lainema |
| 7,606,310 B1 | 10/2009 | Ameres et al. |
| 7,671,894 B2 | 3/2010 | Yea et al. |
| 7,728,840 B2 | 6/2010 | Hung |
| 7,734,821 B2 | 6/2010 | Wang et al. |
| 7,773,677 B2 | 8/2010 | Lee |
| 7,974,233 B2 | 7/2011 | Banerjee |
| 8,005,137 B2 | 8/2011 | Han et al. |
| 8,111,752 B2 | 2/2012 | Kumar et al. |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0071485 A1 | 6/2002 | Caglar et al. |
| 2002/0172289 A1 | 11/2002 | Akiyoshi et al. |
| 2003/0081850 A1 | 5/2003 | Karczewicz et al. |
| 2003/0123545 A1 | 7/2003 | Prakash et al. |
| 2003/0165331 A1 | 9/2003 | Van Der Schaar |
| 2003/0202594 A1 | 10/2003 | Lainema |
| 2003/0215014 A1 | 11/2003 | Koto et al. |
| 2004/0013308 A1 | 1/2004 | Jeon et al. |
| 2004/0042549 A1 | 3/2004 | Huang et al. |
| 2004/0080669 A1 | 4/2004 | Nagai et al. |
| 2004/0184533 A1 | 9/2004 | Wang |
| 2004/0202252 A1 | 10/2004 | Lee |
| 2004/0228410 A1 | 11/2004 | Ameres et al. |
| 2005/0008240 A1 | 1/2005 | Banerji et al. |
| 2005/0123056 A1 | 6/2005 | Wang et al. |
| 2005/0226321 A1 | 10/2005 | Chen |
| 2005/0286629 A1 | 12/2005 | Dumitras et al. |
| 2006/0050695 A1 | 3/2006 | Wang |
| 2006/0062481 A1 | 3/2006 | Suvanto |
| 2006/0126734 A1 | 6/2006 | Wiegand et al. |
| 2006/0198443 A1 | 9/2006 | Liang et al. |
| 2006/0285598 A1 | 12/2006 | Tulkki |
| 2007/0009034 A1 | 1/2007 | Tulkki |
| 2007/0092010 A1 | 4/2007 | Huang et al. |
| 2007/0109409 A1 | 5/2007 | Yea et al. |
| 2007/0130755 A1 | 6/2007 | Duquette et al. |
| 2007/0177665 A1 | 8/2007 | Zhou et al. |
| 2007/0199011 A1 | 8/2007 | Zhang et al. |
| 2007/0201559 A1 | 8/2007 | He |
| 2007/0206673 A1 | 9/2007 | Cipolli et al. |
| 2008/0112486 A1 | 5/2008 | Takahashi et al. |
| 2008/0130755 A1 | 6/2008 | Loukas et al. |
| 2008/0219351 A1 | 9/2008 | Kim et al. |
| 2009/0103610 A1* | 4/2009 | Puri ......................... 375/240.03 |
| 2010/0061444 A1 | 3/2010 | Wilkins et al. |
| 2010/0061461 A1 | 3/2010 | Bankoski et al. |
| 2010/0086027 A1 | 4/2010 | Panchal et al. |
| 2010/0104016 A1 | 4/2010 | Aoki |
| 2010/0239015 A1 | 9/2010 | Wang et al. |
| 2011/0069751 A1 | 3/2011 | Budagavi |

FOREIGN PATENT DOCUMENTS

| | | |
|---|---|---|
| EP | 1496706 | 1/2005 |
| GB | 2403618 | 1/2005 |
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| KR | 100213018 | 8/1999 |
| KR | 20010030916 | 4/2001 |
| WO | WO0150770 | 7/2001 |
| WO | WO03026315 | 3/2003 |
| WO | WO03084235 | 10/2003 |
| WO | WO2006078115 | 7/2006 |
| WO | WO2008008331 | 1/2008 |

OTHER PUBLICATIONS

Bankoski et al. "VP8 Data Format and Decoding Guide" Independent Submission. RFC 6389, Dated Nov., 2011.

Bankoski et al. "VP8 Data Format and Decoding Guide; draft-bankoski-vp8-bitstream-02" Network Working Group. Internet-Draft, May 18, 2011, 288 pp.

Bo Hong: "Introduction to H.264", Internet citation, XP002952898, pp. 5, 14-15, Nov. 22, 2002.

Borman S. et al., "Super-Resolution From Image Sequences—A Review", Proceedings of Midwest Symposium on Circuits and Systems, pp. 374-378, Aug. 9, 1998.

Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.

Feng Wu et al, "Efficient Background Video Coding with Static Sprite Generation and Arbitrary-Shape Spatial Prediction Techniques", IEEE Transactions on Circuits and Systems for Video Technology, vol. 13, No. 5, pp. 394-405, May 1, 2003.

Girod B. et al., "3-D Image Models and Compression: Synthetic Hybrid or Natural Fit?", International Conference on Image Processing, vol. 2, pp. 525-529, Oct. 24, 1999.

Hendry et al., "AHG21: Explicit Reference Pictures Signaling with Output Latency Count Scheme", 7 JCT-VC Meeting; 98 MPEG Meeting Nov. 21, 2011-Nov. 30, 2011; Geneva.

High efficiency video coding (HEVC) text specification draft 6, JCTVC-H1003, JCT-VC 7th meeting, Geneva, Switzerland, Nov. 21-30, 2011.

Hiroshi Watanabe et al, "Sprite Coding in Object-Based Video Coding Standard: MPEG-4", Proceedings of Multiconference on Systemics, Cybernetics and Informatics, vol. 13, pp. 420-425, Jul. 1, 2001.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

International Search Report and Written opinion, from related matter, International Application No. PCT/US2009/056448.

Irani M et al, "Video Compression Using Mosaic Representations", Signal Processing Image Communication, vol. 7 No. 4., pp. 529-552, Nov. 1, 1995.

"Liu, P., et al, ""A fast and novel intra and inter modes decision prediction algorithm for H.264/AVC based-on the characteristics of* u macro-block""", 2009 Fifth Inti. Confr. on Intelligent Information Hiding and Multimedia Signal Processing, pp. 286-289,http:/ /i eeexplore.ieee.o rg/s tamp/stamp.jsp ?tp=&arn umber =533 7483".

(56) References Cited

OTHER PUBLICATIONS

Mozilla, "Introduction to Video Coding Part 1: Transform Coding", Video Compression Overview, Mar. 2012, 171 pp.

Multi-core processor, Wikipedia, the free encyclopedia. Http://wikipedia.org/wiki/Multi-core_processor; dated Apr. 30, 2012.

On2 Technologies, Inc., White Paper On2's TrueMotion VP7 Video Codec, Jul. 11, 2008, pp. 7 pages, Document Version:1.0, Clifton Park, New York.

On2 Technologies, Inc., White Paper On2's TrueMotion VP7 Video Codec, Jan. 10, 2005, pp. 13 pages, Document Version:1.0, Clifton Park, New York.

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Sjoberg R. et al/ "Absolute signaling of refrence pictures", 6 JCT-VC Meeting; 97. MPEG Meeting; Jul. 14, 2011-Jul. 22, 2011; Torinino (Joint Collaborative Team on Video Coding of ISO/*EC JTC1/Sc29/WG11 and ITU-T SG. 16).

VP6 Bitstream & Decoder Specification. Version 1.02. On2 Technologies, Inc. Dated Aug. 17, 2006.

VP8 Data Format and Decoding Guide. WebM Project. Google On2. Dated: Dec. 1, 2010.

Zhi Liu, Zhaoyang Zhang, Liquan Shen, Mosaic Generation in H.264 Compressed Domain, IEEE 2006.

\* cited by examiner

DECIMATED SLIDING WINDOWS FOR MULTI-REFERENCE PREDICTION IN VIDEO CODING

TECHNICAL FIELD

The present disclosure relates in general to video encoding and decoding using sliding windows.

BACKGROUND

Digital video streams typically represent video using a sequence of frames. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Certain of these techniques use reference frames or portions of reference frames to generate differences between the reference and the frame being encoded. The differences can generally be encoded with fewer bits than the original frame.

SUMMARY

Disclosed herein are aspects of systems, methods, and apparatuses using decimated sliding windows for multi-reference prediction coding of a video stream. One aspect of the disclosed implementation is a method for encoding a video stream having a plurality of frames, including allocating a first plurality of buffers, each buffer of the first plurality of buffers configured to store one frame of the plurality of frames, allocating a second plurality of buffers, each buffer of the second plurality of buffers configured to store one frame of the plurality of frames, selecting a reference frame for encoding at least one of the plurality of frames, and assigning a picture ID number to the reference frame. If the first plurality of buffers is full of reference frames, the method includes A) determining a first least recently used reference frame from the first plurality of buffers, B) determining, based on the picture ID number of the first least recently used reference frame and a first decimation factor, if the first least recently used reference frame is to be stored at a buffer of the second plurality of buffers, C) storing the first least recently used reference frame at the buffer of the second plurality of buffers if it is determined that the first least recently used reference frame is to be stored at the buffer of the second plurality of buffers, and D) removing the first least recently used reference frame from the first plurality of buffers. The method also includes storing the reference frame at a buffer of the first plurality of buffers, encoding the at least one of the plurality of frames using the reference frame into an encoded video bitstream, and including the picture ID number of the reference frame and the first decimation factor in the encoded video bitstream.

Another aspect of the disclosed implementations is a method for decoding an encoded video stream having a plurality of frames. The method includes receiving the encoded video stream, the encoded video stream including a picture ID number assigned to a reference frame used to encode at least one of the plurality of frames and a decimation factor, allocating a first plurality of buffers, each buffer of the first plurality of buffers configured to store one frame of the plurality of frames, allocating a second plurality of buffers, each buffer of the second plurality of buffers configured to store one frame of the plurality of frames, and decoding the reference frame. If the first plurality of buffers is full of reference frames, the method includes A) determining a first least recently used reference frame from the first plurality of buffers, B) determining, based on the picture ID number of the first least recently used reference frame and a first decimation factor, if the first least recently used reference frame is to be stored at a buffer of the second plurality of buffers, C) storing the first least recently used reference frame at the buffer of the second plurality of buffers if it is determined that the first least recently used reference frame is to be stored at the buffer of the second plurality of buffers, and D) removing the first least recently used reference frame from the first plurality of buffers. The method also includes storing the reference frame at a buffer of the first plurality of buffers and decoding the at least one of the plurality of frames using the reference frame.

Another aspect of the disclosed implementations is an apparatus for encoding a video stream having a plurality of frames including a memory and a processor. The processor is configured to execute instructions stored in the memory to allocate a first plurality of buffers, each buffer of the first plurality of buffers configured to store one frame of the plurality of frames, allocate a second plurality of buffers, each buffer of the second plurality of buffers configured to store one frame of the plurality of frames, select a reference frame for encoding at least one of the plurality of frames, and assign a picture ID number to the reference frame. The processor is also configured to, if the first plurality of buffers is full of reference frames, A) determine a first least recently used reference frame from the first plurality of buffers, B) determine, based on the picture ID number of the first least recently used reference frame and a first decimation factor, if the first least recently used reference frame is to be stored at a buffer of the second plurality of buffers, C) store the first least recently used reference frame at the buffer of the second plurality of buffers if it is determined that the first least recently used reference frame is to be stored at the buffer of the second plurality of buffers, and D) remove the first least recently used reference frame from the first plurality of buffers. Finally, the processor is configured to store the reference frame at a buffer of the first plurality of buffers, encode the at least one of the plurality of frames using the reference frame into an encoded video bitstream, and include the picture ID number of the reference frame and the first decimation factor in the encoded video bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth. Thus, while a video stream is generally compressed and encoded for transmission over such communications channels, providing sufficient data for good video images when the video stream is reconstructed is a challenge.

Frames of a video stream can be encoded using reference frames to perform motion prediction. Reference frames are frames selected from or generated by the video stream. In some situations, they can be encoded and transmitted as part of the encoded video bitstream. To be used in motion prediction, a reference frame is typically decoded by the encoder and temporarily stored in memory by the encoder before performing motion prediction for one or more following (e.g., temporally nearby) frames. Motion prediction subtracts a possibly translated reference frame or portions of the reference frame from a frame to be encoded or portions thereof to reduce the amount of data to be encoded and inserted into the encoded video bitstream.

When an encoded video bitstream is received at a decoder, the reference frames can also be temporarily stored in memory to be used in performing motion prediction to decode on those frames that have been encoded using motion prediction. The decoder can receive information from the encoder regarding which received frames are to be stored in memory as reference frames and which frames use which reference frames for motion prediction. This information can determine how much memory is allocated by the decoder for reference frame storage and can be included in the encoded video bitstream along with the video frame data.

The amount of buffer memory devoted to reference frame storage in both the encoder and decoder can be considerable. Sliding windows can be used for multi-reference buffer management so that reference frames, or pictures, can be managed in a first-in-first-out manner. Aspects of present disclosure teach multiple decimated sliding windows that can more flexibly manage buffers depending on, for example, a duration that the reference frame is to be used. Teachings herein can also help manage the number of bits included in the encoded video stream to designate reference frames. Before specific details of the decimated sliding windows are described, the environment in which they operate is first described.

Figure 1:
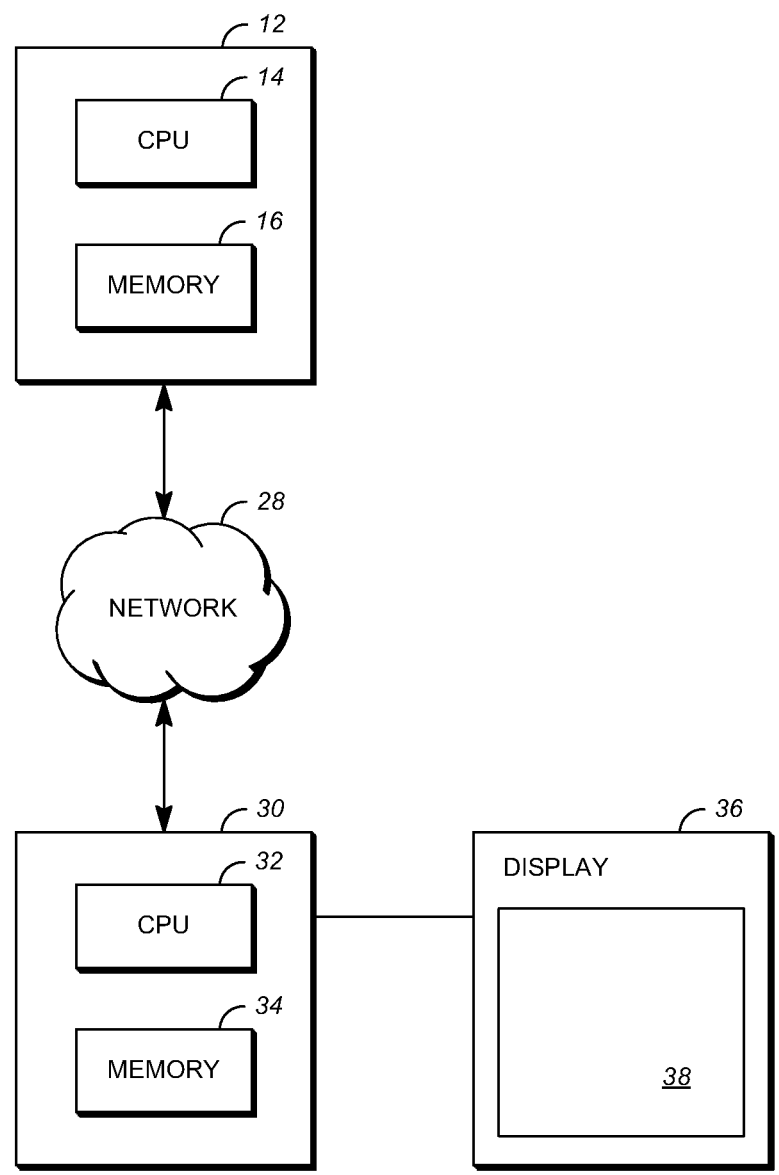
FIG. 1 is a schematic of a video encoding and decoding system.

FIG. 1 is a schematic of a video encoding and decoding system 10. An exemplary transmitting station 12 can be, for example, a computer having an internal configuration of hardware including a processor such as a central processing unit (CPU) 14 and a memory 16. CPU 14 can be a controller for controlling the operations of transmitting station 12. CPU 14 is connected to the memory 16 by, for example, a memory bus. Memory 16 can be read only memory (ROM), random access memory (RAM) or any other suitable memory device. Memory 16 can store data and program instructions that are used by CPU 14. Other suitable implementations of transmitting station 12 are possible. For example, the processing of transmitting station 12 can be distributed among multiple devices.

A network 28 connects transmitting station 12 and a receiving station 30 for encoding and decoding of the video stream. Specifically, the video stream can be encoded in transmitting station 12 and the encoded video stream can be decoded in receiving station 30. Network 28 can be, for example, the Internet. Network 28 can also be a local area network (LAN), wide area network (WAN), virtual private network (VPN), a cellular telephone network or any other means of transferring the video stream from transmitting station 12 to, in this example, receiving station 30.

Receiving station 30, in one example, can be a computer having an internal configuration of hardware including a processor such as a CPU 32 and a memory 34. CPU 32 can be a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT), or a light emitting diode display (LED), such as an OLED display. Display 36 is connected to CPU 32 and can be configured to display a rendering 38 of the video stream decoded in receiving station 30.

Other implementations of encoder and decoder system 10 are possible. In some of the implementations described, for example, an encoder is in transmitting station 12 and a decoder is in receiving station 30 as instructions in memory or a component separate from memory. However, an encoder or decoder can be connected to a respective station 12, rather than in it. Further, one implementation can omit the network 28 and/or the display 36. In another implementation, a video stream can be encoded and then stored for transmission at a later time to receiving station 30 or any other device having memory. In one implementation, a video stream is received by receiving station 30 (e.g., via network 28, a computer bus and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission of the encoded video. In another implementation, a transport protocol other than RTP may be used, e.g., an HTTP-based video streaming protocol.

Figure 2:
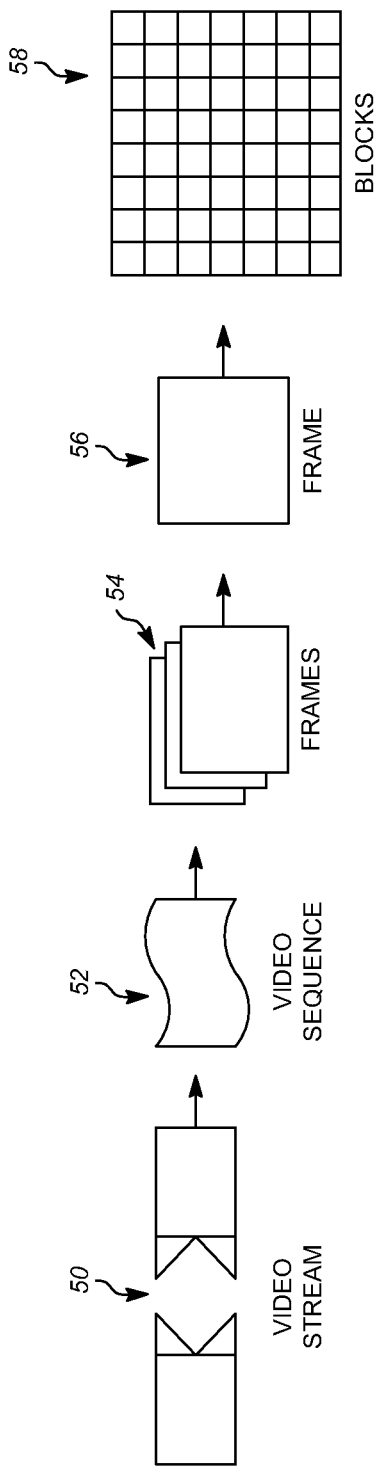
FIG. 2 is a diagram of a typical video stream to be encoded and decoded.

FIG. 2 is a diagram of a typical video stream 50 to be encoded and decoded. Video stream 50 includes a video sequence 52. At the next level, video sequence 52 includes a number of adjacent frames 54. While three frames are depicted as adjacent frames 54, video sequence 52 can include any number of adjacent frames. Adjacent frames 54 can then be further subdivided into individual frames, e.g., a single frame 56. At the next level, single frame 56 can be divided into a series of blocks 58, which can contain data corresponding to, for example, 16×16 pixels in frame 56. Each block can contain luminance and chrominance data for the corresponding pixels. Blocks 58 can also be of any other suitable size such as 16×8 pixel groups or 8×16 pixel groups and can be further subdivided into smaller blocks depending on the application. Unless otherwise noted, the terms block and macroblock are used interchangeably herein.

Figure 3:
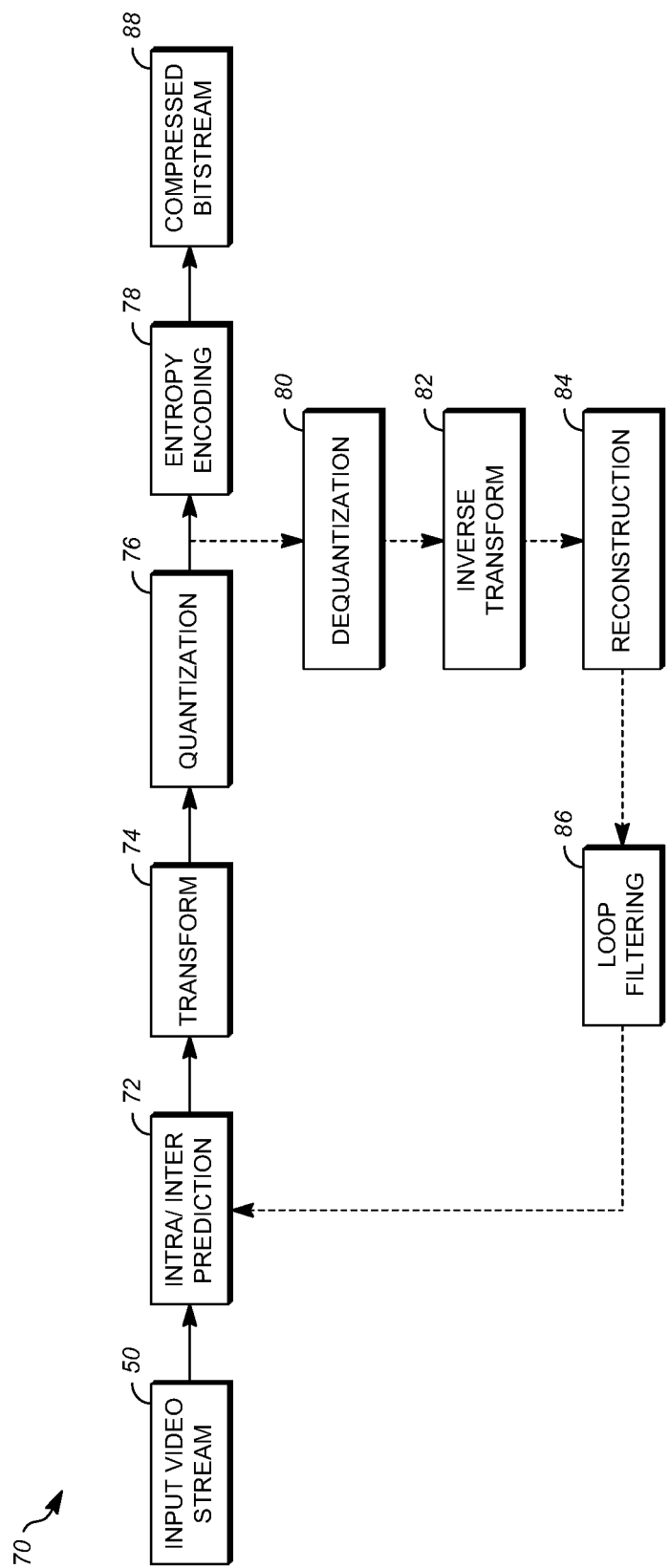
FIG. 3 is a block diagram of a video compression system in accordance with one implementation.

FIG. 3 is a block diagram of an encoder 70 in accordance with one implementation. Encoder 70 can be implemented, as described above, in transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. Encoder 70 has the following stages to perform the various functions in a forward path (shown by the solid connection lines) to produce an encoded or a compressed bitstream 88 using input video stream 50: an intra/inter prediction stage 72, a transform stage 74, a quantization stage 76, and an entropy encoding stage 78. Encoder 70 may also include a reconstruction path (shown by the dotted connection lines) to reconstruct a frame for encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within the video stream 50 is processed in units of blocks. At intra/inter prediction stage 72, each block can be encoded using either intra-frame prediction (within a single frame) or inter-frame prediction (from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loéve Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 76 converts the transform coefficients into discrete quantum values, which are referred to as quantized transform coefficients, using a quantizer value or quantization level. The quantized transform coefficients are then entropy encoded by entropy encoding stage 78. The entropy-encoded coefficients, together with other information used to decode the block, which may include information such as the type of prediction used, motion vectors, and quantizer value, are then output to compressed bitstream 88. Compressed bitstream 88 can be formatted using various techniques, such as variable length encoding (VLC) and arithmetic coding. Compressed bitstream 88 can also be referred to as an encoded video stream or bitstream and the terms will be used interchangeably herein.

The reconstruction path in FIG. 3 (shown by the dotted connection lines) can be used to ensure that both the encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another implementation, an encoder 70 can have quantization stage 76 and dequantization stage 80 combined into a single stage.

Figure 4:
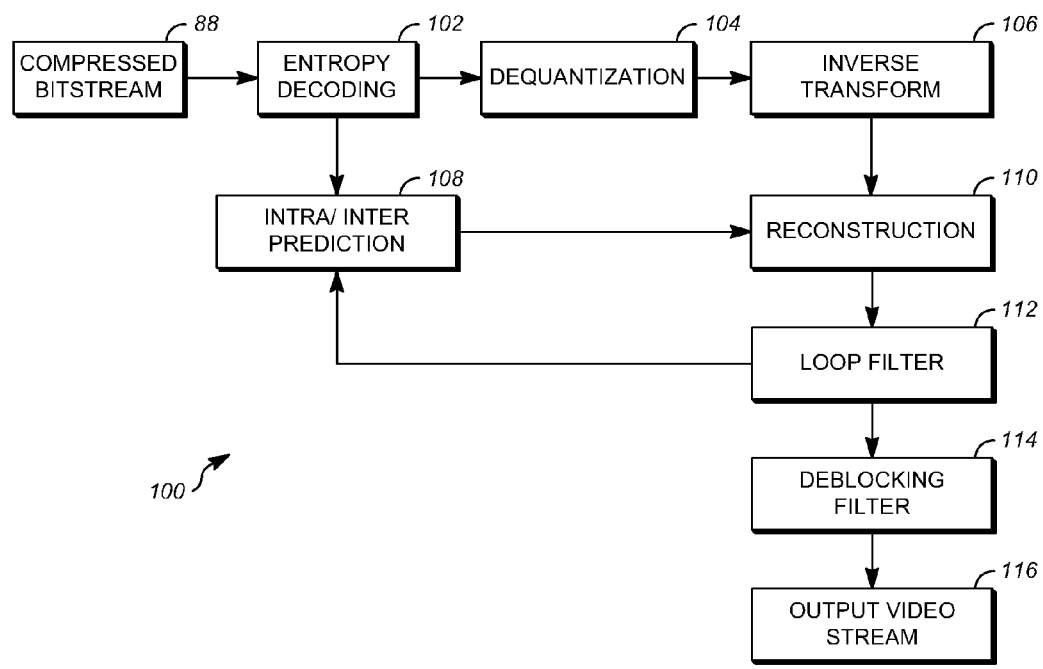
FIG. 4 is a block diagram of a video decompression system in accordance with another implementation.

FIG. 4 is a block diagram of a decoder 100 in accordance with another implementation. Decoder 100 can be implemented in receiving station 30, for example, by providing a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 (using, for example, Context Adaptive Binary Arithmetic Decoding) to produce a set of quantized transform coefficients. Dequantization stage 104 dequantizes the quantized transform coefficients, and inverse transform stage 106 inverse transforms the dequantized transform coefficients to produce a derivative residual that can be identical to that created by inverse transform stage 82 in encoder 70. Using header information decoded from compressed bitstream 88, decoder 100 can use intra/inter prediction stage 108 to create the same prediction block as was created in encoder 70, e.g., at intra/inter prediction stage 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116. Output video stream 116 can also be referred to as a decoded video stream and the terms will be used interchangeably herein.

Other variations of decoder 100 can be used to decode compressed bitstream 88. For example, decoder 100 can produce output video stream 116 without deblocking filtering stage 114.

Sliding windows can be efficient for multi-reference buffer management. Reference frames or pictures can be managed in a first-in-first-out manner, like a sliding window. Due to this operation, picture removal commands or a picture list can be omitted, saving overhead bits. In combination with unique picture IDs (e.g., frame identifiers), sliding windows can provide a robust design for multi-reference prediction. For example, lost reference frames, if any, can be detected, and good reference frames can also be identified.

One problem, however, is that the reference frames stay in a reference buffer for a limited amount of time that is proportional to the number of reference buffers used. If a long duration is desired for one or more reference frames, more reference buffers and hence more memory would be needed. This increased memory requirement results in increased cost and power and may not be feasible in applications where memory size is limited. One option is to use the concept of long-term frames, that is, storing certain frames to be used for motion prediction for a longer duration than others. This, however, would require a complex buffer management scheme, as well as increased overhead.

In contrast, the decimated sliding windows described herein can perform multi-reference buffer management that increases the duration of a subset of the reference pictures without increasing memory requirements.

Figure 5:
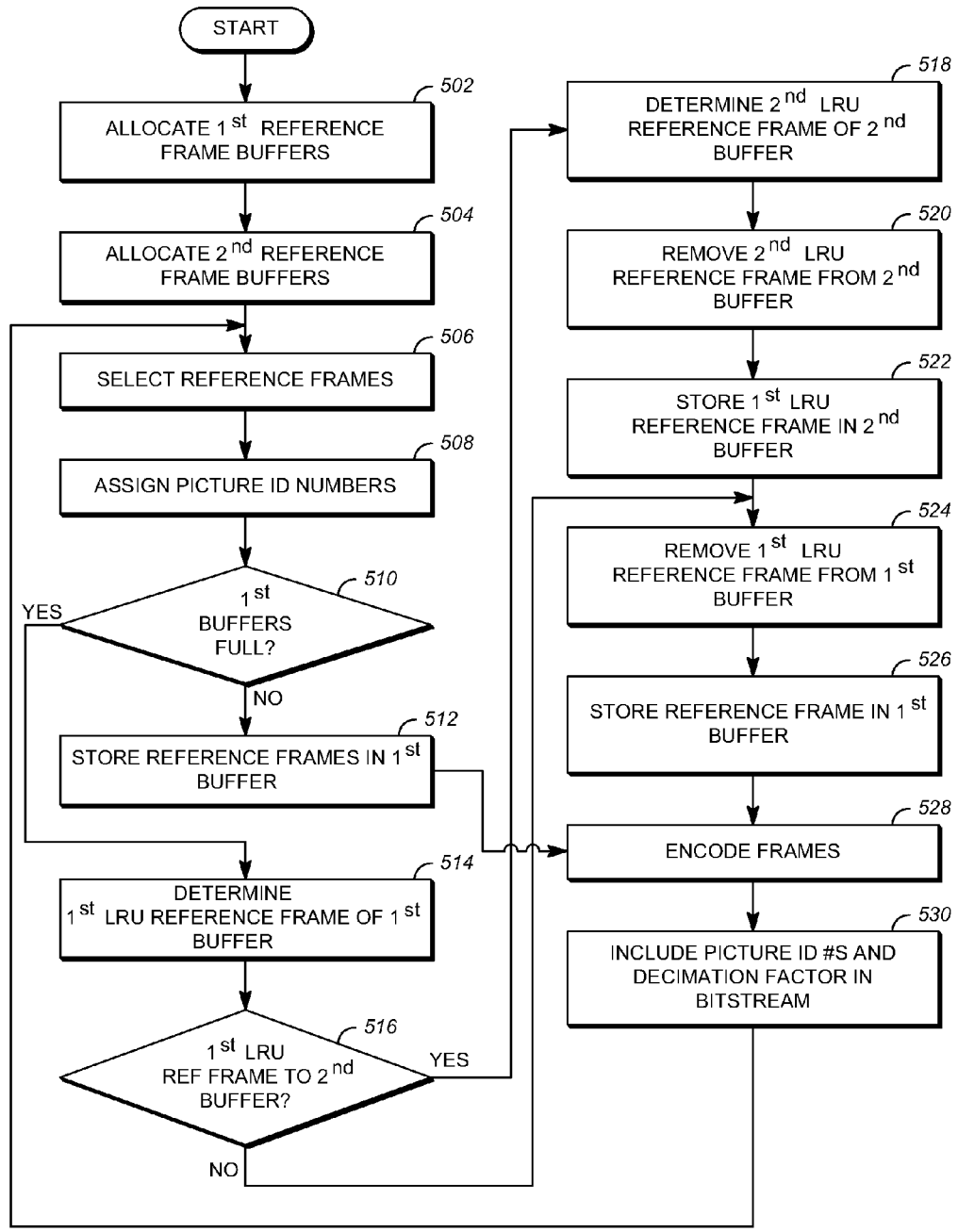
FIG. 5 is a flowchart illustrating a process for managing reference frame storage by an encoder using multiple sliding window buffers according to an implementation of the teachings herein.

FIG. 5 is a flowchart illustrating a process 500 for managing reference frame storage by an encoder using multiple sliding window buffers according to an implementation of the teachings herein. Process 500 can be implemented, for example, as a software program that is executed by computing devices such as transmitting station 12 or receiving station 30. For example, the software program can include machine-readable instructions that are stored in a memory such as memory 16 or memory 34, and that when executed by a processor, such as CPU 14 or CPU 32, cause the computing device to perform process 500. Process 500 can also be implemented using hardware. As explained above, some computing devices may have multiple memories and multiple processors, and the steps of method of operation 500 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

Further, for simplicity of explanation, process 500 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 502, a first group of reference frame buffers is allocated in memory. A reference frame buffer is a range of memory locations sized to include a video frame to be used as a reference for motion prediction by an encoder, for example encoder 70. The reference frame can be selected from an input video stream (e.g., when using lossless encoding) or can be a constructed reference frame. By allocated, this disclosure means designated, reserved, indicated or allocated in any manner whatsoever to a software program executing on a computing device, for example transmitting station 12 or receiving station 30. At step 504, a second group of reference frame buffers is allocated in memory, also sized to include video frames to be used for motion prediction. The first and second groups of reference frame buffers are accessible to a prediction stage of an encoder, such as intra/inter prediction stage 72. Reference frame buffers will be described in more detail in relation to FIGS. 7 and 8, below.

At step 506, reference frames are selected or constructed from the input video stream to be used for motion prediction of (e.g., temporally nearby) frames of the video streams. Hereinafter, reference frames are described as being selected whether they are selected or constructed frames. Frames selected as reference frames are encoded and included in the encoded video bitstream and are also decoded, for example using stages 80, 82, 84 and 86 to be returned to intra/inter prediction stage 72, for use in performing motion prediction. Reference frames can be encoded and decoded before use in performing motion prediction at the encoder in order to more closely match the data available at a decoder. At step 508, picture ID numbers are assigned to frames selected from the input video stream 50 to be used as reference frames. Reference frames may also be called reference pictures herein. Picture ID numbers are assigned from a limited range of numbers. Since the picture ID numbers are included in the encoded video bitstream, it can be advantageous to limit the size of the numbers to be included. When the list of picture ID numbers is exhausted, assigning picture ID numbers can begin again at the beginning, e.g., 0.

At step 510, a test is made to determine if the first reference frame buffers are full, meaning that the first reference frame buffers have previously had reference frames assigned to them. If the first reference frame buffers are not full, at step 512, reference frames with assigned picture ID numbers are stored in the first reference frame buffers. Storing a reference frame at or in a reference frame buffer can mean that the data bits included in the reference frame are copied to the memory locations allocated for the buffer. Alternatively, storing a reference frame at or in a reference frame buffer can mean adding a memory pointer that points to memory locations occupied by the reference frame to a reference frame buffer array that includes memory pointers to the reference frames.

When the reference frame is stored at a reference frame buffer, the value in the first reference frame buffers array at the index which represents the reference frame buffer can be changed from, for example, −1, which indicates an empty buffer, to the picture ID number of the reference frame stored at the buffer. The first reference frame buffers array can be a data structure that keeps track of the reference buffers by an index number, storing the picture ID number of the reference frame stored at that buffer location, a memory pointer to the memory locations that contain the reference frame data and a linked list that keeps track of the order in which reference frames were inserted into the reference frame buffers. In this fashion, by altering the entries in the first buffer array, the reference frames can be managed without having to move large amounts of data in memory.

After the reference frame is stored in the reference frame buffer at step 512, process 500 advances to step 528, which is discussed in more detail below.

At step 512, a reference frame is to be stored in one of the first reference frame buffers; however, the first reference frame buffers may be full already with previously stored reference frames in response to the query of step 510. Steps 514 through 526 thus include techniques for freeing a reference frame buffer in order to store the next reference frame. At step 514, the least recently used (LRU) reference frame included in the first reference frame buffers is determined. Determine means to select, indicate, choose or determine in any manner whatsoever. The least recently used reference frame can be determined by arranging the first reference frame buffers as a first-in-first-out stack. In this arrangement, the first reference frame buffers keep track of the order in which reference frames were stored in the first reference frame buffers. The least recently used reference frame is the reference frame that was stored in the first reference buffers first. It should be noted that managing reference frame buffers as described herein can be accomplished by manipulating memory pointers that indicate the starting locations of the individual buffers, as opposed to copying the contents of the reference frame buffers from one buffer to another.

At step 516, the least recently used reference frame from the first reference frame buffers can be tested to determine if it is to be discarded or if it is to be moved to the second reference frame buffers. The test can be performed by dividing the picture ID number of the reference frame by a decimation factor. The decimation factor can be an integer, for example 2, 5 or 10. In this example, if the remainder after dividing the picture ID number by the decimation factor is zero, meaning that the decimation factor is an integer divisor of the picture ID number, the least recently used reference frame from the first reference frame buffers is to be moved to the second reference frame buffers.

If the least recently used reference frame is to be moved to the second reference frame buffers in response to the query of step 516, it is stored in a second reference frame buffer in a similar manner as described with respect to the storing of a reference frame in the first buffer in step 512 before proceeding to step 524, discussed below. If, however, the second reference frame buffers are full, at step 518, the least recently used reference frame from the second reference buffers is determined in a similar way as the least recently used reference frame from the first reference buffers was determined at step 514. The second reference frame buffer can also be arranged as a first-in-first-out stack so the oldest or first stored reference frame is the least recently used reference frame. At step 520, the least recently used reference frame from the second reference frame buffers is removed from the second reference frame buffers and is discarded. This can optionally be accomplished, for example, by replacing the picture ID number in the second reference buffer array with "−1" to indicate that the buffer is free and re-linking the linked list that keeps track of the first-in-first-out status of the reference frame buffers. Alternatively, this step is combined with step 522 (e.g., because the buffer ID can be set directly to the picture ID number of the least recently used reference frame from the first reference frame buffers).

At step 522, the least recently used reference frame from the first reference frame buffers is moved to the second reference buffers at the position newly opened up in step 520. This can be accomplished by copying the memory pointer and picture ID number of the least recently used reference frame from the first reference frame array to the second reference frame array without having to move large amounts of data, and re-linking the linked list to indicate that this reference frame is the most recently used reference frame, for example. At step 524, the least recently used reference frame is removed from the first reference frame buffers by setting the picture ID number field of the first reference frame buffer to "−1" and re-linking the linked list to indicate a new least recently used reference frame, for example.

Referring again to step 516, if the least recently used reference frame of the first reference frame buffers is to be discarded instead of stored in the second reference frame buffers, processing advances directly to step 524 to remove the least recently used reference frame from the first reference frame buffers.

At step 526, the reference frame to be stored from step 506 is stored in the first reference frame buffer at the location freed in step 524. As described above, this can be accomplished by copying bits from the previous location of the reference frame or by simply copying a memory pointer that points to the memory locations occupied by the reference frame to a reference frame buffer array and updating the linked list to indicate that this reference frame is the most recently used reference frame.

At step 528, frames of the input video stream are encoded using one or more of the reference frames stored in the reference frame buffers to perform, for example, motion prediction, and the encoded frames are then included in the output video bitstream. At step 530, the picture ID numbers of the one or more reference frames used to encode the frame along with the decimation factor are also included in the encoded video bitstream, typically in a header for the frame. Alternative implementations can include more than two groups of reference frame buffers. In these cases, determination of least recently used reference frame buffers and decimation of picture ID numbers to determine if a reference frame should be moved from a group of reference frame buffers to a higher numbered group of reference frame buffers would proceed as described above, possibly with different values for the decimation factors. In these cases, the number of reference frame buffers to use can be included in the encoded video stream along with picture ID numbers and a decimation factor for each group of reference frame buffers.

After step 530, process 500 returns to step 506 to handle a new reference frame until all frames of a video stream are encoded.

Figure 6:
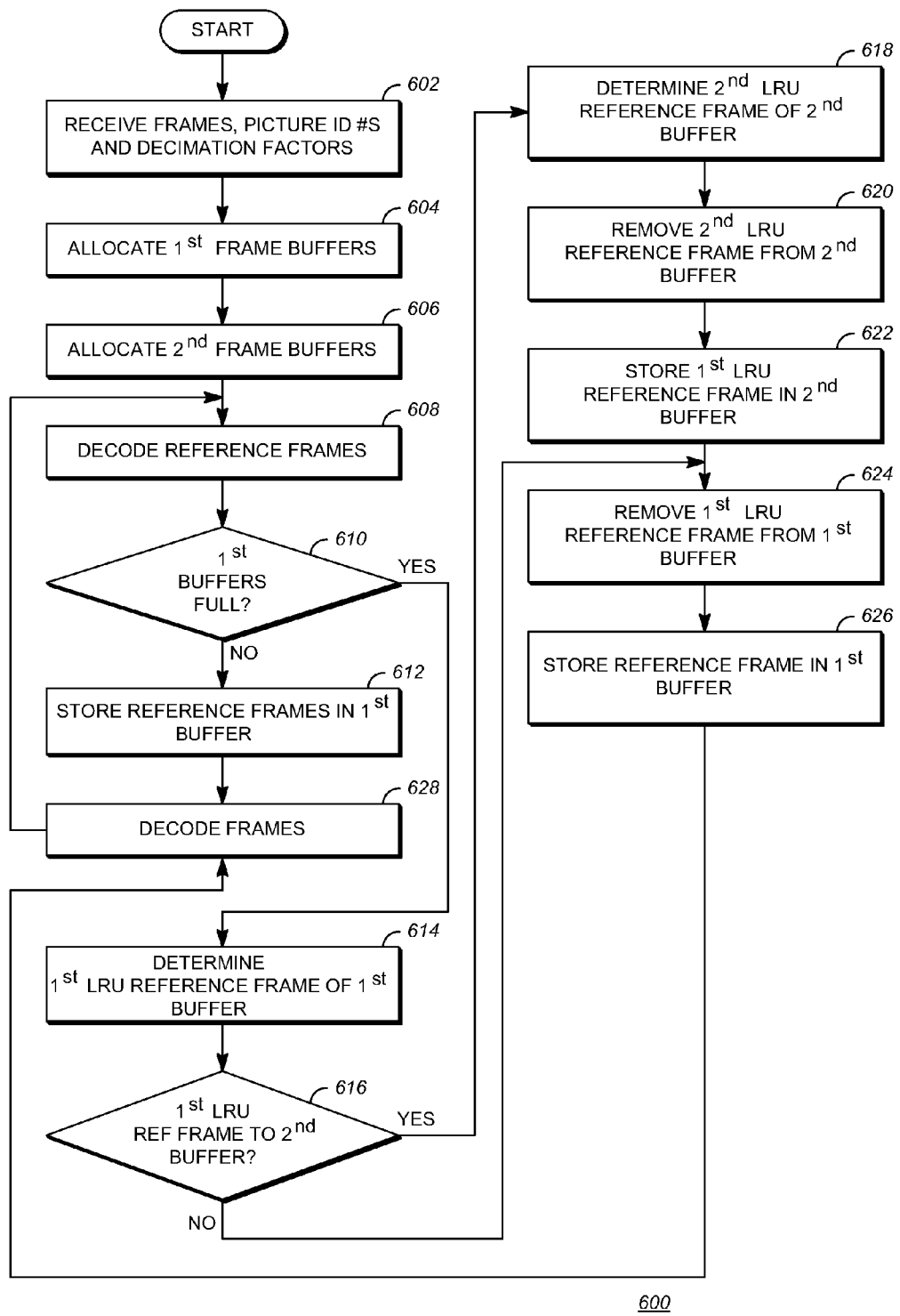
FIG. 6 is a flowchart illustrating a process for managing reference frame storage by a decoder using multiple sliding window buffers according to an implementation of the teachings herein.

FIG. 6 is a flowchart illustrating a process 600 for managing reference frame storage by a decoder using multiple sliding window buffers according to an implementation of the teachings herein. Process 600 can be implemented, for example, as a software program that is executed by computing devices such as transmitting station 12 or receiving station 30. For example, the software program can include machine-readable instructions that are stored in a memory such as memory 16 or memory 34, and that when executed by a processor, such as CPU 14 or CPU 32, cause the computing device to perform process 600. Process 600 can also be implemented using hardware. As explained above, some computing devices may have multiple memories and multiple processors, and the steps of process 600 may in such cases be distributed using different processors and memories.

Further, for simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, an encoded video bitstream is received by a computing device. The encoded video bitstream includes encoded frames, picture ID numbers and one or more decimation factors. The encoded video bitstream can be received in any number of ways, such as by receiving the bitstream over a network, over a cable, or by reading the bitstream from a primary memory or other storage device, including a disk drive or removable media such as a CompactFlash (CF) card, a Secure Digital (SD) card, or the like.

At step 604, a first group of reference frame buffers is allocated in memory. At step 606, a second group of reference frame buffers is allocated in memory. Like the reference frame buffers allocated in FIG. 5, each reference frame buffer can be a range of memory locations sized to include a video frame to be used for motion prediction. The first and second groups of reference frame buffers are accessible to a prediction stage, such as intra/inter prediction stage 108 of decoder 100. Reference frame buffers will be described in more detail in relation to FIGS. 7 and 8, below.

At step 608, at least one reference frame is decoded by the decoder. Reference frames are decoded in order to be used to decode frames encoded using motion prediction. At step 610, the first reference frame buffers are checked to determine if they are full. As described with respect to FIG. 5, reference frame buffers can be managed by using a reference frame buffers array that includes an index number, the picture ID number, a memory pointer to the memory locations that stores the reference frame and a linked list that keeps track of the first-in-first-out status of the reference frames included in the reference frame buffers, for example. In an example, if the picture ID number associated with a particular reference frame buffer is −1, that buffer is free.

If a free buffer is found, the reference frame is stored in the first reference frame buffers at step 612 and is used for decoding frames of the video stream in step 628 as discussed in more detail below. If no free buffer is found in response to the query of step 610, process 500 advances to step 614, where the least recently used reference frame in the first reference frame buffers can be determined, for example, by examining a linked list associated with the first reference frame buffers. At step 616, the picture ID number of the least recently used reference frame from the first reference frame buffers is examined along with the decimation factor to determine if the least recently used reference frame is to be moved to the second reference frame buffers or is to be discarded. As described above, the picture ID number can be divided by the decimation factor using integer division. If the picture ID number is evenly divisible by the decimation factor, in an implementation the least recently used reference frame is to be moved to the second reference frame buffers.

If the least recently used reference frame is to be moved to the second reference frame buffers in response to the query of step 616, it is stored in a second reference frame buffer in a similar manner as described with respect to the storing of a reference frame in the first buffer in step 612 before proceeding to step 624, discussed below. If, however, the second reference frame buffers are full, at step 618, the least recently used reference frame from the second reference buffers is determined in a similar way as the least recently used reference frame from the first reference buffers is determined at step 614. At step 620, the least recently used frame from the second reference frame buffers is removed by, for example, setting the picture ID number at the array index associated with that reference frame buffer to "−1" and re-linking the linked list to indicate a new least recently used reference frame. At step 622, the least recently used reference frame from the first reference frame buffers is moved to the second reference frame buffers by, for example, copying the picture ID number and the memory pointer to the second reference frame buffers array and re-linking the linked list.

At step 624, the least recently used reference frame is removed from the first reference frame buffers by, for example, setting the picture ID number to "−1" and re-linking the linked list. At step 626, the reference frame to be stored is stored in the first reference frame buffers by setting the picture ID number of the reference frame buffers array at the array index corresponding to the reference frame buffer being to the picture ID number of the reference frame and copying the memory pointer of the reference frame to the reference frame buffers array, for example.

Referring again to step 616, if the least recently used reference frame of the first reference frame buffers is to be discarded instead of stored in the second reference frame buffers, processing advances directly to step 624 to remove the least recently used reference frame from the first reference frame buffers.

After the reference frame to be stored from step 608 is stored in the first reference frame buffers in step 626, processing 600 advances to step 628, where frames of the input video stream are decoded for display using one or more of the reference frames stored in the reference frame buffers performing, for example, motion prediction. As in process 500, process 600 can include alternative implementations with more than two groups of reference frame buffers.

After step 628, process 600 returns to step 608 to handle a new reference frame until all frames of a video stream are decoded.

Figure 7:
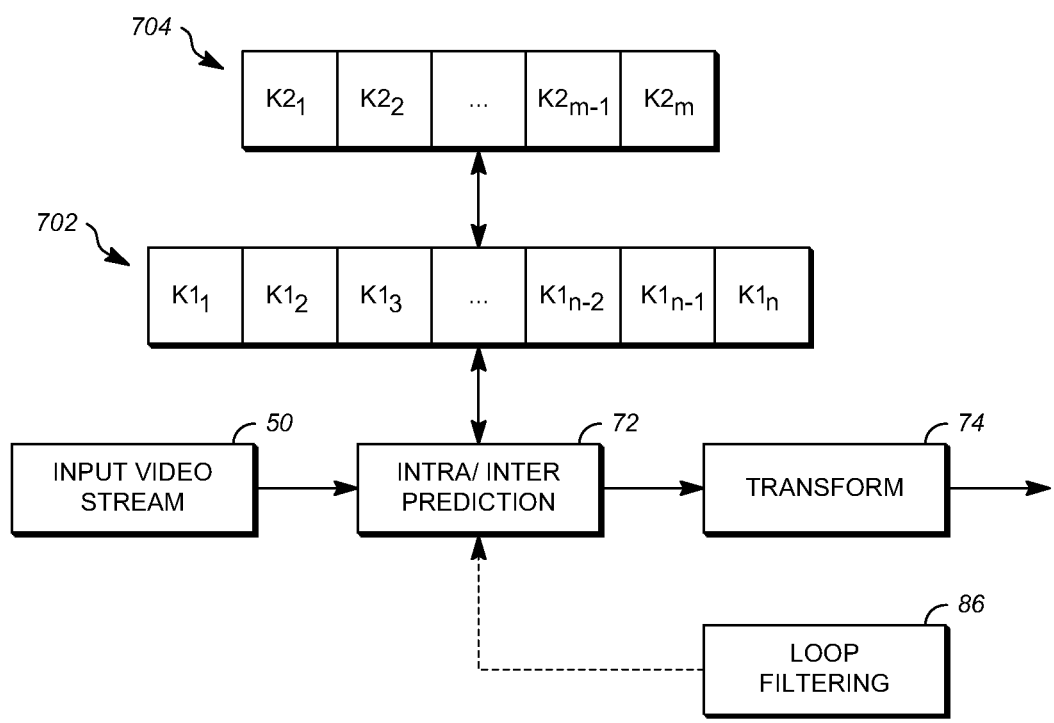
FIG. 7 is a block diagram of a portion of an encoder according to FIG. 3 illustrating first reference frame buffers and second reference frame buffers according to FIG. 5.

FIG. 7 is a block diagram of a portion 700 of an encoder 70 according to FIG. 3 illustrating first reference frame buffers 702 and second reference frame buffers 704 according to FIG. 5. First reference frame buffers 702 include reference frame buffers $K1_1$ through $K1_n$ in communication with intra/inter prediction stage 72. Second reference frame buffers 704 include reference frame buffers $K2_1$ through $K2_m$, which are managed by intra/inter prediction stage 72 and receive data from first reference frame buffers 702. Both first reference frame buffers 702 and second reference frame buffers 704 are accessible directly by intra/inter prediction stage 72 to perform encoding using motion prediction.

Figure 8:
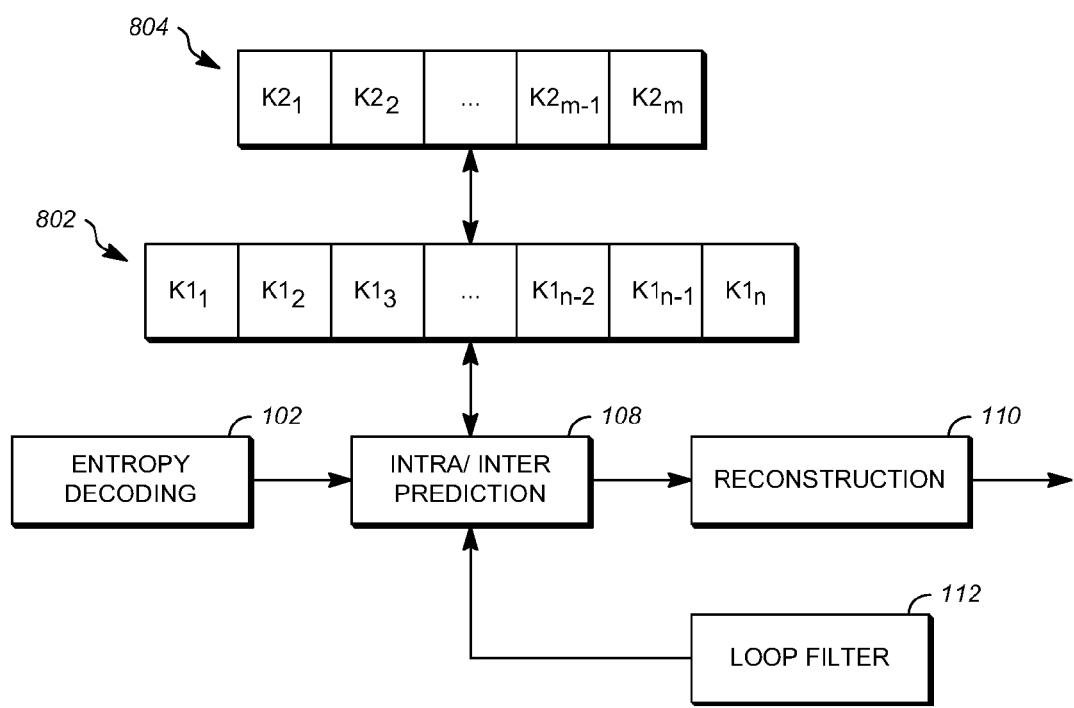
FIG. 8 is a block diagram of a portion of a decoder according to FIG. 4 illustrating first reference frame buffers and second reference frame buffers according to FIG. 6.

FIG. 8 is a block diagram of a portion 800 of a decoder 100 according to FIG. 4 illustrating first reference frame buffers 802 and second reference frame buffers 804 according to FIG. 6. First reference frame buffers 802 include reference frame buffers $K1_1$ through $K1_n$ in communication with intra/inter prediction stage 108. Second reference frame buffers 804 include reference frame buffers $K2_1$ through $K2_m$, which are managed by intra/inter prediction stage 108 and receive data from first reference frame buffers 802. Both first reference frame buffers 802 and second reference frame buffers 804 are accessible directly by intra/inter prediction stage 108 to perform decoding using motion prediction.

A single buffer sliding window approach as initially discussed can be used for multi-reference prediction in low-delay mode where the encoding or decoding order is the same as the output or display order. That is, the coded pictures are intra predicted (e.g., I-frames) or are inter predicted from previous frames only (e.g., P-frames). Frames that need picture re-ordering before display (e.g., B-frames) are not included. In such a scenario, the picture ID number is increased by "1" for every coded picture in a cyclic manner (modulo operation). In a sliding window operation, the reference pictures are moved out of the reference buffer in first-in-first-out manner. The buffer management can be very simple and can avoid employing any command or syntax in the bitstream other than knowing that sliding window operation is being used. Overhead bits for buffer management can be avoided, but the reference pictures can only stay in the reference buffer for a limited time in the absence of more reference buffers and thus higher memory usage.

In contrast, multi-reference buffer management using a decimated sliding window operation can increase the availability duration of a subset of the reference frames while minimizing memory usage and overhead. A decimated sliding window will discard certain reference frames according to a pre-defined rule. For example, those frames with an even picture ID number are kept and those with an odd picture ID number are discarded. This can be understood as decimation by a factor of 2.

Similarly, those reference frames with a picture ID number that can be divided by a factor N without a remainder can be kept while others can be deleted from the reference buffers. Since the deleted frames are no longer available for prediction, the encoder can be made aware of this fact and use the available reference frames for prediction accordingly. Since only one frame out of N reference frames will be stored in the reference buffers, the same amount of memory can make the reference frames available for a longer duration, about N times longer.

FIGS. 7 and 8 can be used to illustrate an example of two-stage decimated windows. In video compression coding, temporally nearby frames are commonly used for motion prediction. In order to make temporally nearby reference frames available for motion prediction by the encoder or decoder, as well as keep other reference frames available for a longer duration, a two-stage sliding window mode can be defined. In this example, there are a total of K reference buffers split into two groups, with n buffers for the K1 reference frame buffers (first reference frame buffers 702, 802) and m buffers for the K2 reference frame buffers (second reference frame buffers 704, 804) where n+m=K.

In this two-stage decimated sliding window mode, the n most recent K1 reference frames will be kept in the first reference frame buffers 702, 802. Once a reference frame is out of the frame window (e.g., more than n reference frames are selected in step 506 of FIG. 5 or are decoded in step 608 of FIG. 6), only the frames with a picture ID number that is a multiple of N will be moved to the second reference frame buffers 704, 804. Others will be deleted and the corresponding buffers will be marked as unused for reference by, for example, setting the picture ID number to −1. A maximum of m most recent reference frames outside of the first n reference frames with a picture ID number that is a multiple of N will be kept in the second reference frame buffer 704, 804.

In an example, a current reference frame has a picture ID number=50. If the first reference frame buffers K1 have n=3, the second reference frame buffers K2 have m=4, and a decimation factor is N=2, then the reference buffers before adding reference frame 50 contain reference frames with the following picture ID numbers when both buffers are full:

K1=49, 48, 47; and
K2=46, 44, 42, 40.

After encoding and decoding the current reference frame with picture ID number=50, the reference frame buffers will contain frames with the following picture ID numbers:

K1=50, 49, 48; and
K2=46, 44, 42, 40.

Since the reference frame with a picture ID number of 47 is not a multiple of 2, it is removed from the reference buffers. After encoding next reference frame 51, then the reference frame buffers will contain frames with the following picture ID numbers:

K1=51, 50, 49; and
K2=48, 46, 44, 42.

The above described two-stage sliding window can be extended to a multi-stage sliding window, where each stage can have a different decimation factor. The decimated sliding window operation modes can be carried in the bitstream to permit the decoder to operate the same way as the encoder. The bitstream syntax can include the following parameters in the sequence header, picture header, slice header or segment header: (1) Current picture ID number; (2) Number of decimated windows (including the first sliding window); and (3) Decimation factor of each sliding window.

Aspects of disclosed implementations can permit recovery from lost or corrupted reference frames. A frame can be lost or corrupted due to transmission error or packet loss, and therefore one or more reference frames may not be in the decoder buffer. Thus, the encoder buffer and the decoder buffer may not be the same. However, this mismatch can be detected, and one or more of the good reference frames can be used for prediction to recover the errors since the sliding windows at the decoder side can hold some reference frames for a longer time with the same number of reference buffers. If a reference frame is lost or corrupted, this frame will not be put into the reference buffer. All the useful reference frames except the lost/corrupted reference frames will still be in the reference buffer with a unique picture ID number. The decoder will be able to use these correctly decoded reference frames for prediction.

The implementations of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Implementations of transmitting station 12 and/or receiving station 30 (and the algorithms, methods, instructions, etc., stored thereon and/or executed thereby, including by encoder 70 and decoder 100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, in one implementation, for example, transmitting station 12 or receiving station 30 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device. In this instance, transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, for example, content that was not transmitted by transmitting station 12. Other suitable transmitting station 12 and receiving station 30 implementation schemes are available. For example, receiving station 30 can be a generally stationary personal computer rather than a portable communications device and/or a device including an encoder 70 may also include a decoder 100.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream having a plurality of frames, comprising:
    allocating a first plurality of buffers, each buffer of the first plurality of buffers configured to store one frame of the plurality of frames;
    allocating a second plurality of buffers, each buffer of the second plurality of buffers configured to store one frame of the plurality of frames;
    selecting a reference frame for encoding at least one of the plurality of frames;
    assigning a picture ID number to the reference frame;
    if the first plurality of buffers is full of reference frames:
        A) determining a first least recently used reference frame from the first plurality of buffers;
        B) determining, based on the picture ID number of the first least recently used reference frame and a first decimation factor, if the first least recently used reference frame is to be stored at a buffer of the second plurality of buffers;
        C) storing the first least recently used reference frame at the buffer of the second plurality of buffers if it is determined that the first least recently used reference frame is to be stored at the buffer of the second plurality of buffers; and
        D) removing the first least recently used reference frame from the first plurality of buffers;
    storing the reference frame at a buffer of the first plurality of buffers;
    encoding the at least one of the plurality of frames using the reference frame into an encoded video bitstream; and
    including the picture ID number of the reference frame and the first decimation factor in the encoded video bitstream.

2. The method of claim 1 wherein storing the first least recently used reference frame at the buffer of the second plurality of buffers comprises:
    if the plurality of second buffers is full of reference frames:
        determining a second least recently used reference frame from the second plurality of buffers; and
        removing the second least recently used reference frame from the second plurality of buffers.

3. The method of claim 2, further comprising:
    allocating a third plurality of buffers, each buffer of the third plurality of buffers configured to store one frame of the plurality of frames;
    determining, based on the picture ID number of the second least recently used reference frame and a second decimation factor, if the second least recently used reference frame is to be stored at a buffer of the third plurality of buffers; and
    storing the second least recently used reference frame at the buffer of the third plurality of buffers if it is determined that the second least recently used reference frame is to be stored at the buffer of the third plurality of buffers.

4. The method of claim 3 wherein the first decimation factor is equal to the second decimation factor.

5. The method of claim 1 wherein determining if the first least recently used reference frame is to be stored at the buffer of the second plurality of buffers comprises:
    determining if the picture ID number of the first least recently used reference frame is evenly divisible by the first decimation factor, wherein the first decimation factor is an integer.

6. The method of claim 1 wherein encoding the at least one of the plurality of frames using the reference frame comprises performing motion prediction for the at least one of the plurality of frames using the reference frame.

7. The method of claim 1 wherein the first plurality of buffers and the second plurality of buffers are each organized as a first-in-first-out stack.

8. The method of claim 1, further comprising:
    defining an array index for the first plurality of buffers; and
    defining a linked list that keeps track of an order in which reference frames are stored in the first plurality of buffers; wherein
    storing the reference frame at the buffer of the first plurality of buffers comprises:
        inserting the picture ID number of the reference frame in an index of the array index, the index associated with the buffer of the first plurality of buffers; and
        updating the linked list.

9. The method of claim 8 wherein removing the first least recently used frame comprises:
    setting an index of the array index that is associated with a buffer of the first plurality of buffers storing the first least recently used reference frame to a value indicating that the buffer storing the first least recently used reference frame is unused before storing the reference frame at the first plurality of buffers; and
    updating the linked list to indicate a new least recently used reference frame.

10. A method for decoding an encoded video stream having a plurality of frames, comprising:

receiving the encoded video stream, the encoded video stream including a picture ID number assigned to a reference frame used to encode at least one of the plurality of frames and a decimation factor;

allocating a first plurality of buffers, each buffer of the first plurality of buffers configured to store one frame of the plurality of frames;

allocating a second plurality of buffers, each buffer of the second plurality of buffers configured to store one frame of the plurality of frames;

decoding the reference frame;

if the first plurality of buffers is full of reference frames:
  A) determining a first least recently used reference frame from the first plurality of buffers;
  B) determining, based on the picture ID number of the first least recently used reference frame and a first decimation factor, if the first least recently used reference frame is to be stored at a buffer of the second plurality of buffers;
  C) storing the first least recently used reference frame at the buffer of the second plurality of buffers if it is determined that the first least recently used reference frame is to be stored at the buffer of the second plurality of buffers; and
  D) removing the first least recently used reference frame from the first plurality of buffers;

storing the reference frame at a buffer of the first plurality of buffers; and decoding the at least one of the plurality of frames using the reference frame.

11. The method of claim 10 wherein determining if the first least recently used reference frame is to be stored at the buffer of the second plurality of buffers comprises:

determining if the picture ID number of the first least recently used reference frame is evenly divisible by the first decimation factor, wherein the first decimation factor is an integer.

12. The method of claim 10 wherein storing the first least recently used reference frame at the buffer of the second plurality of buffers comprises:

if the plurality of second buffers is full of reference frames:
  determining a second least recently used reference frame from the second plurality of buffers; and
  removing the second least recently used reference frame from the second plurality of buffers.

13. The method of claim 12, further comprising:

allocating a third plurality of buffers, each buffer of the third plurality of buffers configured to store one frame of the plurality of frames;

determining, based on the picture ID number of the second least recently used reference frame and a second decimation factor, if the second least recently used reference frame is to be stored at a buffer of the third plurality of buffers; and storing the second least recently used reference frame at the buffer of the third plurality of buffers if it is determined that the second least recently used reference frame is to be stored at the buffer of the third plurality of buffers.

14. The method of claim 10 wherein decoding the at least one of the plurality of frames using the reference frame comprises performing motion prediction for the at least one of the plurality of frames using the reference frame.

15. The method of claim 14 wherein the first plurality of buffers and the second plurality of buffers are each organized as a first-in-first-out stack.

16. An apparatus for encoding a video stream having a plurality of frames, comprising:

a memory; and a processor configured to execute instructions stored in the memory to:
  allocate a first plurality of buffers, each buffer of the first plurality of buffers configured to store one frame of the plurality of frames;
  allocate a second plurality of buffers, each buffer of the second plurality of buffers configured to store one frame of the plurality of frames;
  select a reference frame for encoding at least one of the plurality of frames;
  assign a picture ID number to the reference frame;
  if the first plurality of buffers is full of reference frames:
    A) determine a first least recently used reference frame from the first plurality of buffers;
    B) determine, based on the picture ID number of the first least recently used reference frame and a first decimation factor, if the first least recently used reference frame is to be stored at a buffer of the second plurality of buffers;
    C) store the first least recently used reference frame at the buffer of the second plurality of buffers if it is determined that the first least recently used reference frame is to be stored at the buffer of the second plurality of buffers; and
    D) remove the first least recently used reference frame from the first plurality of buffers;
  store the reference frame at a buffer of the first plurality of buffers;
  encode the at least one of the plurality of frames using the reference frame into an encoded video bitstream; and
  include the picture ID number of the reference frame and the first decimation factor in the encoded video bitstream.

17. The apparatus of claim 16 wherein the first plurality of buffers and the second plurality of buffers are allocated in the memory and are each organized as a first-in-first-out stack.

18. The apparatus of claim 16 wherein the processor is configured to:

determine that the first least recently used reference frame is to be stored at the buffer of the second plurality of buffers when the picture ID number of the first least recently used reference frame is evenly divisible by the first decimation factor.

19. The apparatus of claim 18 wherein the processor is configured to:

if the plurality of second buffers is full of reference frames:
  determine a second least recently used reference frame from the second plurality of buffers; and
  remove the second least recently used reference frame from the second plurality of buffers.

20. The apparatus of claim 19 wherein the processor is configured to:

allocate a third plurality of buffers, each buffer of the third plurality of buffers configured to store one frame of the plurality of frames;

determine that the second least recently used reference frame is to be stored at a buffer of the third plurality of buffers when the picture ID number of the second least recently used reference frame is evenly divisible by a second decimation factor; and store the second least recently used reference frame at the buffer of the third plurality of buffers if it is determined that the second least recently used reference frame is to be stored at the buffer of the third plurality of buffers.

* * * * *